Sept. 15, 1931.    E. PIERCE    1,823,760
CHAIN OR CABLE JACK
Filed March 3, 1928    2 Sheets-Sheet 1

Elmer Pierce
INVENTOR
BY Victor J. Evans
ATTORNEY

WITNESS:

Sept. 15, 1931.  E. PIERCE  1,823,760
CHAIN OR CABLE JACK
Filed March 3, 1928  2 Sheets-Sheet 2
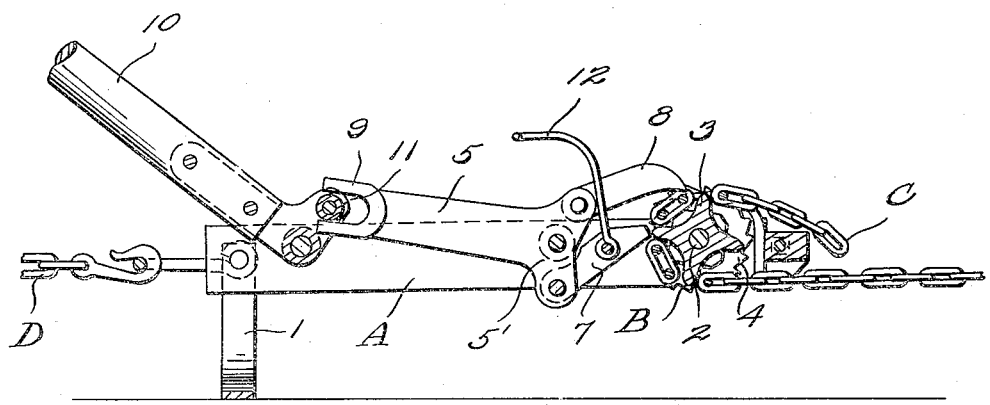
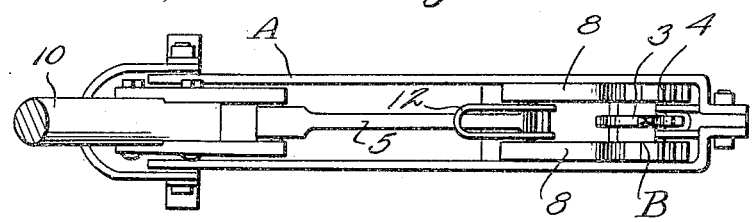
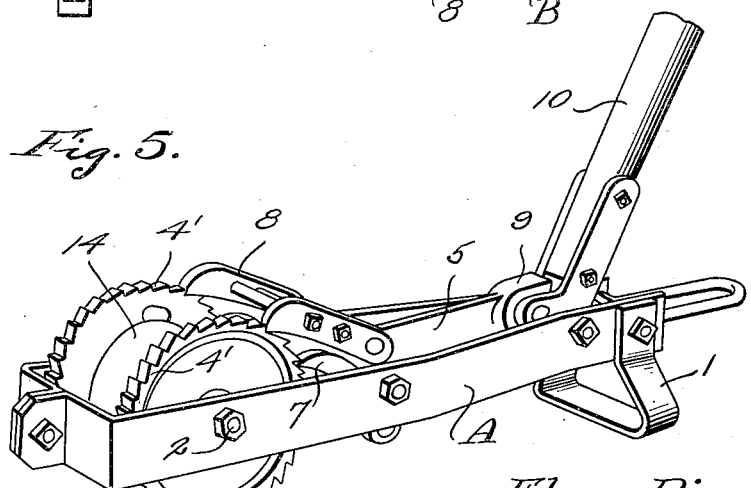
Elmer Pierce
INVENTOR
BY Victor J. Evans
ATTORNEY
WITNESS: R. E. Wise Patented Sept. 15, 1931

1,823,760

UNITED STATES PATENT OFFICE

ELMER PIERCE, OF BRAZIL, INDIANA

CHAIN OR CABLE JACK

Application filed March 3, 1928. Serial No. 258,971.

This invention relates to a chain or cable jack, the general object of the invention being to provide a frame, a rotary member supported thereby for engaging a chain or cable, a lever pivoted in the frame and having upper and lower dogs thereon for engaging ratchet means on the rotary member, with a handle for rocking the lever to cause the dogs to give the ratchet means and the rotary member a step by step movement to stretch the chain or cable.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a view similar to Figure 1, but showing the parts in another position.

Figure 4 is a plan view.

Figure 5 is a perspective view showing the device modified so that it can be used with a cable.

Figure 1:
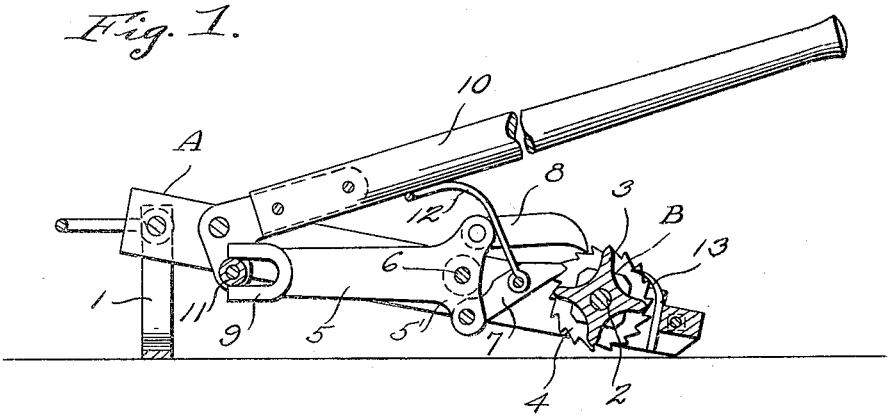
Figure 1 is a longitudinal sectional view through the device, showing the parts in one position.
Figure 2:
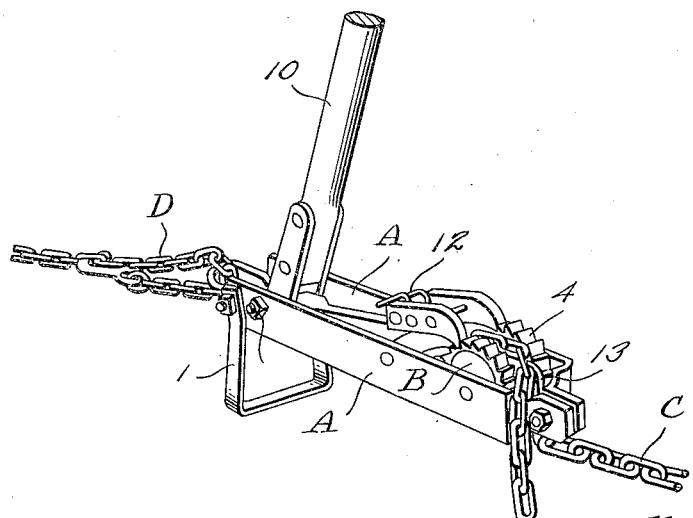
Figure 2 is a perspective view of the device.

In these views, A indicates a frame which has one end supported in raised position by the yoke 1 which is pivoted to the frame. A rotary member B is supported between the side bars of the frame by means of the shaft 2 and this member is composed of the star wheel 3 and the two ratchet wheels 4, the star wheel being arranged between the ratchet wheels. A lever 5 has an enlarged end 5' which is pivoted in the frame by the bolt 6 and a pair of dogs 7 is pivoted to the lower part of the enlarged end of the lever and a pair of dogs 8 is pivoted to the upper part of said enlarged end. These two sets of dogs engage the two ratchet wheels.

The front end of the lever 5 is forked, as shown at 9, and a hand lever 10 is pivoted in this part of the frame and has a depending part which carries a roller 11 for engaging the forked part of the lever. Thus as the handle 10 is rocked on its pivot, the lever 5 is given a rocking movement on its pivot so that the dogs 7 and 8 alternately engage the ratchet wheels and thus the rotary member is given a step by step movement. As the member is turned, the points of the star wheel 3, engaging the links of the chain C, will cause the chain to travel around the rotary member and thus the chain will be tightened. A second chain D is fastened to the opposite end of the device. A handle 12 is fastened to the lower dogs 7 so that the dogs can be raised out of engagement with the ratchet wheels and a curved upright 13 is placed in rear of the rotary member to cause the loose end of the chain to pass therefrom.

In the modification shown in Figure 5, the rotary member is made in the form of a drum 14, with the ratchet wheels 4' at its ends, this device being adapted for use with a cable.

From the foregoing it will be seen that this device can be used for exerting a pull upon a chain or cable which is attached to an object, the operator simply moving the hand lever back and forth to impart a rocking movement to the rotary member to take up the slack in the chain or cable.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a frame, a rotary member carried thereby, ratchet wheels carried by the rotary member, a lever having an enlarged end pivoted in the frame, a lower set of dogs pivoted to the enlarged end, an upper set of dogs pivoted to the enlarged end, said dogs engaging the ratchet wheels when the lever is rocked, a hand lever pivoted in the frame and having a part engaging the lever for rocking the same when the hand lever is rocked, a handle connected with the lower set of dogs, and a curved upright member carried by the frame in rear of the rotary member for causing the loose end of a chain to leave the rotary member.

2. A device of the class described comprising a frame, a rotary member journaled in one end of the frame, a ratchet wheel on the rotary member, a lever having an enlarged end pivoted in the frame, upper and lower dogs pivoted to the enlarged end of the lever, said dogs engaging the ratchet wheel when the lever is rocked, a handle member pivoted in the other end of the frame and having a projection at its lower end, said lever having a forked end, between the prongs of which the projection fits whereby the lever is rocked when the handle member is actuated and an upwardly extending handle member connected with the lower dog whereby the same can be moved out of engagement with the ratchet wheel.

3. A device of the class described comprising a frame, a rotary member journaled in one end of the frame, a ratchet wheel on the rotary member, a lever having an enlarged end pivoted in the frame, with its other end forked, upper and lower dogs pivoted to the enlarged end of the lever and engaging the ratchet wheel when the lever is rocked, a handle member pivoted in the other end of the frame and having a projection at its lower end extending between the prongs of the forked end of the lever, an upwardly extending handle connected with the lower dog and a curved upright member carried by the frame in rear of the rotary member.

4. A jack of the character described comprising a horizontally disposed elongated open frame, a rotary member journaled in one end of the frame, a ratchet wheel carried by the rotary member, a substantially T-shaped lever arranged longitudinally within the frame and pivoted centrally of the large end thereof, upper and lower pawls pivoted on the large end of the lever for coaction with the said ratchet wheel incident to the operation of the lever, a handle, a pair of substantially L-shaped plates secured to the opposite sides of the handle and projecting beyond the adjacent end thereof with the short branches of said plate projecting above the frame, a pivot connecting said plate and supporting the latter and said handle on one end of the frame, the adjacent end of said lever being bifurcated, and a roller supported by the short branches of said plate above the pivot therefor and operating in the bifurcated extremity of the lever for the purpose specified.

In testimony whereof I affix my signature.

ELMER PIERCE.